United States Patent [19]
Sidebottom

[11] 3,820,577
[45] June 28, 1974

[54] VISCOUS FLUID HANDLING DEVICE

[76] Inventor: Ray F. Sidebottom, 5841 Olive Dr., Bakersfield, Calif. 93308

[22] Filed: Jan. 31, 1972

[21] Appl. No.: 221,981

[52] U.S. Cl............... 141/67, 141/45, 141/88, 141/231, 141/369, 222/318, 222/399
[51] Int. Cl............................................. B65b 3/14
[58] Field of Search........... 141/45, 67, 70, 86–88, 141/231, 369; 222/399, 318; 239/143, 124

[56] References Cited
UNITED STATES PATENTS

| | | | |
|---|---|---|---|
| 2,038,053 | 4/1936 | Miles et al. | 222/399 X |
| 2,164,172 | 6/1939 | Dalton | 222/399 |
| 2,923,440 | 2/1960 | Ve Horn | 239/143 X |
| 3,016,841 | 1/1962 | Albertson et al. | 222/318 X |
| 3,232,489 | 2/1966 | Buffington | 222/399 X |
| 3,500,881 | 3/1970 | Salmans | 141/88 |

Primary Examiner—Houston S. Bell, Jr.
Assistant Examiner—Charles Gorenstein
Attorney, Agent, or Firm—Huebner & Worrel

[57] ABSTRACT

A viscous fluid handling device having a frame; a pressure tank having upper and lower ends defining an interior mounted in the frame; a source of compressed air communicating with the interior of the tank; a conduit, having a remote end, mounted at the lower end of the tank in communication with the interior; a selectively operable release valve mounted at the remote end of the conduit; and a metering valve mounted in operable association with the source of compressed air operable to maintain a desired air pressure within the interior of the tank to motivate viscous fluid from the tank through the conduit for selective discharge by operation of the release valve.

3 Claims, 3 Drawing Figures

PATENTED JUN 28 1974

VISCOUS FLUID HANDLING DEVICE

BACKGROUND OF THE INVENTION

The present invention relates to a viscous fluid handling device and more particularly to such a device which facilitates the mixing, storing and discharging of viscous fluids for use on a regular basis and without the necessity for frequent cleaning and repair.

There has been a problem in the mixing, storing and discharging of viscous fluids particularly in manufacturing where such fluids must be used in rather large quantities on a frequent basis. Chemicals, plastics, cements and the like which possess relatively high degrees of viscosity are conventionally transferred by a mechanical pump from a storage area to a work area for use. Because of the resistance of viscous fluids to flow, such pumps are heavily burdened and commonly require frequent repair or replacement.

In the manufacturing of ceramic objects in particular there has been a problem in the mixing, storing and injecting of the ceramic clay or slip. The slip is a viscous fluid which resists pumping and congeals readily when exposed to evaporation or when in contact with a porous surface such as that of a ceramic mold. Conventional slip handling devices utilize mechanical means for continually mixing the slip to avoid its coagulation and mechanical pumps to motivate the slip through a hose for injection into the molds. Because of the resistance of the viscous fluids to movement, such mechanical elements have very short operational lives requiring frequent repair or replacement. This is, of course, onerous, expensive, timeconsuming and thus significantly detracts from the efficient operation of a ceramic business.

In small commercial operations and for use in the home, the slip has been hand mixed and poured from buckets into the molds. However, it is difficult to pour the slip evenly and as a result frequently the ceramic object does not bond evenly and develops fissures and cracks which make the ceramic object useless.

SUMMARY OF THE INVENTION

It is therefore an object of the present invention to provide a viscous fluid handling device which facilitates the mixing, storing and discharging of viscous fluids for use on a regular basis.

Another object is to provide such a handling device which has a minimum of moving parts so as to minimize service and repair.

Another object is to provide such a handling device which is particularly suited for use in the mixing, storing and discharging of ceramic slip for injection into molds.

Another object is to provide such a handling device which permits storage of the slip for a prolonged period of time when the device is not in use without the necessity of continually mixing the slip.

Another object is to provide such a handling device which permits precise control over the quantity of slip injected into the molds and insures an even flow of the slip without the inclusion of air bubbles or the formation of sheer lines in the object cast.

A further object is to provide such a handling device which provides means for collecting the excess slip not used in the molds for recirculation for subsequent reuse.

Further objects and advantages are to provide improved elements and arrangements thereof in a device for the purposes described which is dependable, economical, durable and fully effective in accomplishing its intended purposes.

DESCRIPTION OF THE PREFERRED EMBODIMENT

Figure 1:
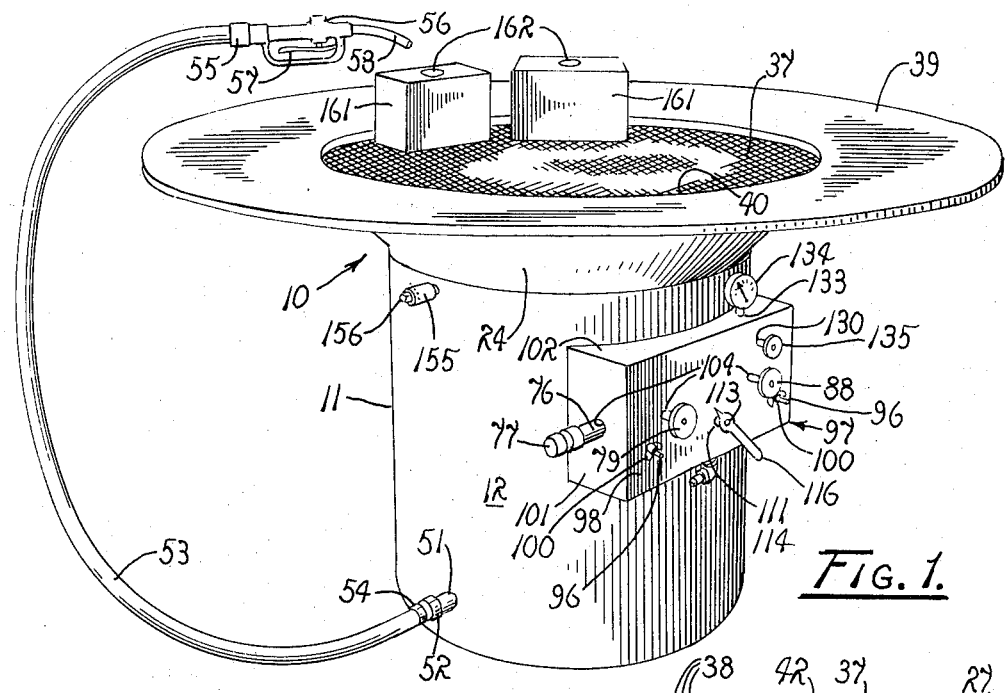
FIG. 1 is a perspective view of the handling device of the present invention showing ceramic molds supported thereon for injection with slip.
Figure 2:
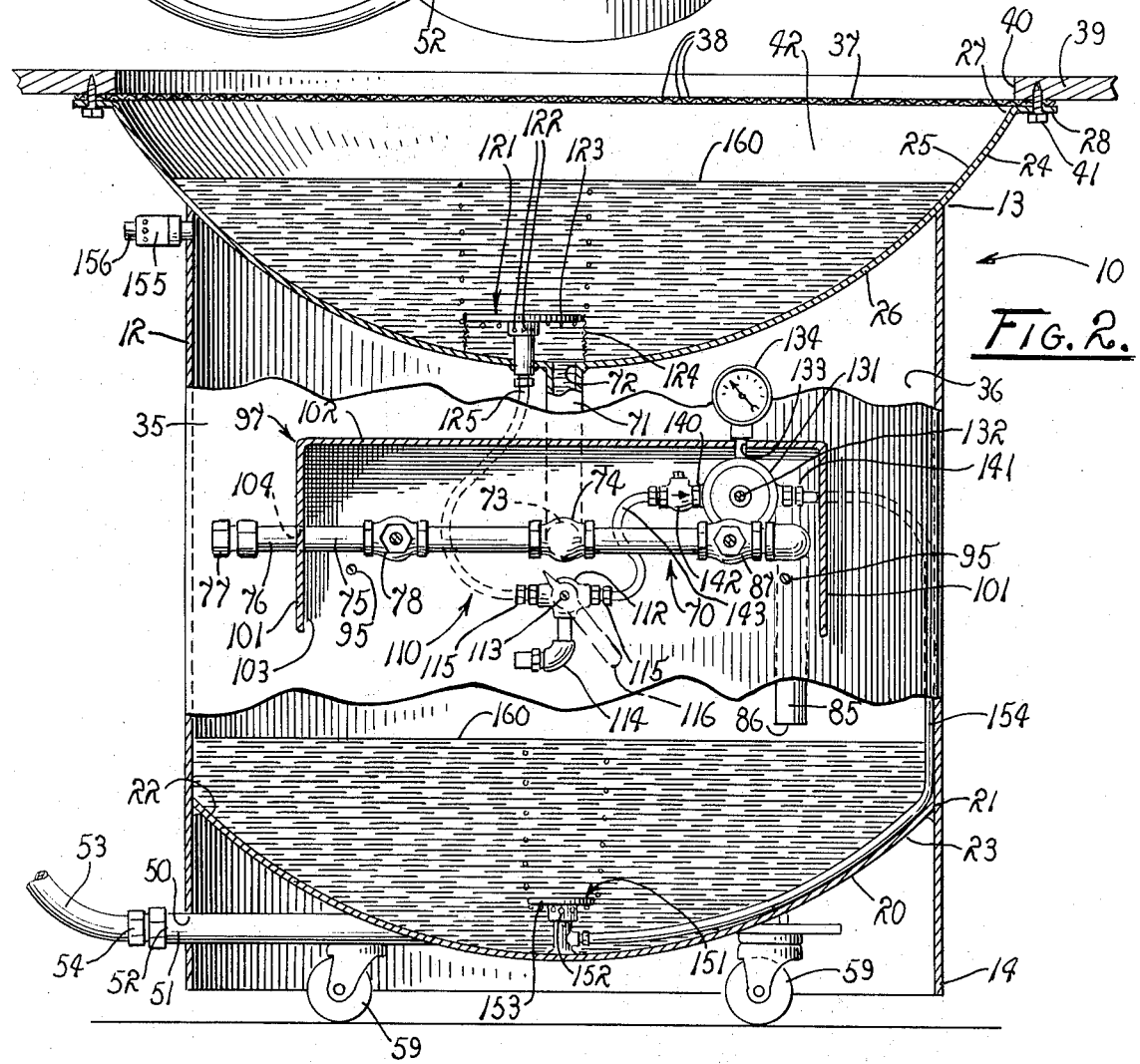
FIG. 2 is a fragmentary, vertical section of the handling device.

Referring more particularly to the drawings, FIG. 1 shows the viscous fluid handling device of the present invention, generally indicated by the numeral 10. The handling device has a frame or housing 11 consisting essentially of a cylindrical wall 12 having an upper end 13 and a lower end 14. A concave bottom wall 20 having a peripheral edge 21 is mounted in the housing adjacent to its lower end with the peripheral edge 21 mounted in sealing relation, as by welding, to the cylindrical wall. The bottom wall has an inner surface 22 and an outer surface 23. The bottom wall is positioned just inwardly of the lower end of the cylindrical wall, as best shown in FIG. 2. A concave top wall 24 of somewhat larger diameter than the bottom wall is mounted in the upper end of the cylindrical wall and secured in sealing relation, as by welding, therein. The top wall has an inner surface 25 and an outer surface 26. The top wall has an upper end 27 having a laterally extending peripheral flange 28 thereabout, as shown in FIG. 2.

The cylindrical wall 12, bottom wall 20, and top wall 24 define an airtight pressure tank 35 having an interior 36. A rigid grate 37 having a plurality of openings 38 therein, is mounted on the peripheral flange 28 of the top wall 24 and extends outwardly thereover. A platform 39 having a central opening 40 is mounted in covering relation to the grate on the peripheral flange with the central opening exposing the openings of the grate. The grate and platform are removably secured in position by screws 41. The inner surface of the top wall and the grate define a receptacle 42.

A bore 50 is provided in the cylindrical wall 12 adjacent to its lower end 14. A discharge conduit 51 is mounted on and extends from the outer surface 23 of the bottom wall 20 in communication with the interior 36 of the tank 35. The conduit extends through the bore outwardly of the cylindrical wall and has a remote internally threaded outer end 52. A flexible hose 53 having an externally threaded coupling end 54 and a remote end 55 is operably connected to the outer end of the conduit with the externally threaded coupling threadably received in the internally threaded outer end of the conduit. A conventional, normally closed, release valve 56 is mounted on the remote end of the hose and is manually operable through a trigger 57. An injector nozzle 58 extends from the release valve, as shown in FIG. 1. Four swivel wheels 59 are preferably secured, as by welding, on the outer surface 23 of the bottom wall 20 extending through the lower end 14 in spaced relation so as to maintain the handling device 10 in a stable, upright position.

Figure 3:
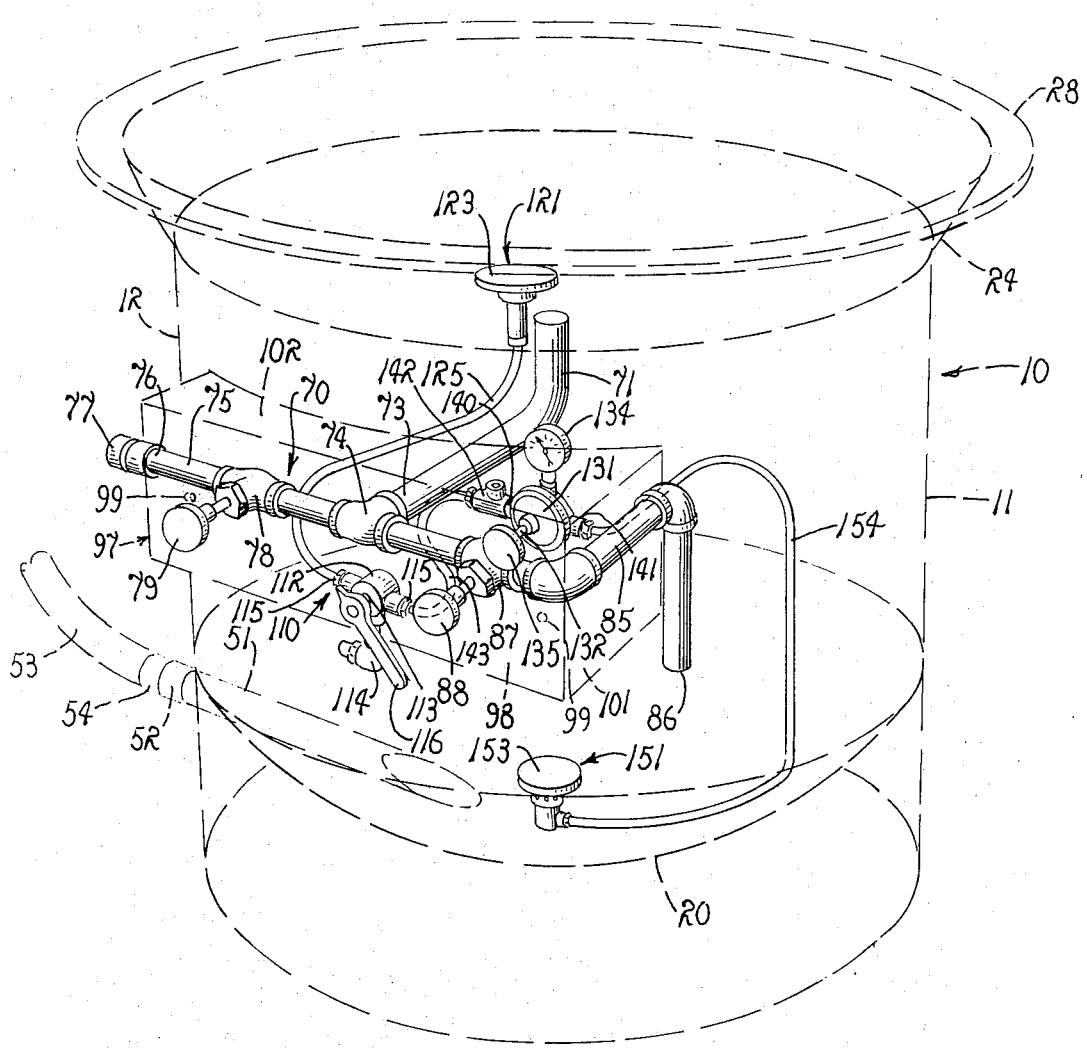
FIG. 3 is a somewhat enlarged, perspective view of the compressed air system and recirculation system of the handling device with the handling device shown in dashed lines.

A recirculation system 70 is provided in the handling device 10, as best shown in FIG. 3. The recirculation system includes a drain conduit 71 having a drain opening 72 at one end thereof and an opposite threaded end 73. The conduit 71 is weldably secured at its drain opening end to the outer surface 26 of the top wall 24 centrally thereof and in communication with the receptacle 42. The drain conduit extends downwardly and then laterally through the cylindrical wall 12 of the handling device so that the threaded end extends outwardly of the cylindrical wall. A T-coupling 74 is threadably received on the threaded end of the drain conduit. A drain pipe 75 having a remote end 76 is mounted in the T-coupling extending laterally therefrom at right angles to the drain conduit. A drain plug 77 is removably received in the remote end of the drain pipe. A first drain valve 78 having a manually operable handle 79 is mounted on the drain pipe, as best shown in FIG. 3.

A return pipe 85 is mounted in the T-coupling 74 and extends therefrom in a direction opposite to the drain pipe 75. The return pipe extends from the T-coupling through the cylindrical wall 12 of the housing 11 and subsequently downwardly in the interior 36 of the tank 35. The return pipe has a discharge opening 86 at the remote downwardly extending end thereof. A second drain valve 87 having a manually operable handle 88 extending therefrom is operatively mounted on the return pipe on the exterior of the housing 11 as best shown in FIG. 3.

A pair of mounting studs 95 having threaded ends 96 are mounted on the cylindrical wall 12 of the housing 11, by any suitable means such as welding, and extend laterally therefrom in spaced parallel relation. A cover housing 97 having a front wall 98 with a pair of holes 99 provided therein is mounted on the cylindrical wall 12 of the housing 11 with the threaded ends of the studs extending through the holes. A pair of wing nuts 100 are screw threadably secured on the threaded ends of the studs releasably to hold the cover housing on the cylindrical wall in covering relation to the first drain valve 78 and second drain valve 87, as best shown in FIG. 2. The housing has opposite end walls 101 and a top wall 102 which, along with the front wall, define an interior portion 103. Three openings 104 are provided in the cover housing. One of the openings is provided in an end wall for the receipt of the drain pipe 75 therethrough. The other two openings are provided in the front wall for the receipt therethrough of the handles 79 and 88 of the drain valves 78 and 87, respectively.

A compressed air system 110 is provided in the handling device 10. A mounting bore 111 is provided in the front wall 98 of housing 97 in a predetermined position centrally thereof. A selector valve 112 forming part of the compressed air system and having a forwardly extending shaft 113 is mounted in the interior portion 103 of the housing with the shaft extending through the bore. The selector valve has a downwardly extending intake coupling 114 and opposite laterally extending outlet couplings 115. A selector lever 116 is mounted on the shaft of the selector valve on the exterior of the housing.

A mixing member or bubbler 121 is mounted in the top wall 24 immediately adjacent to the drain opening 72 in the receptacle 42. The bubbler has a plurality of air openings 112 and a cover plate 123 extending horizontally thereover. A cylindrical screen is removably fitted over the bubbler in covering relation to the drain opening. A first air line 125 operatively interconnects one of the outlet couplings 115 of selector valve 112 with the bubbler 121.

A mounting bore 130 is provided in the front wall 98 of the housing 97. A regulator valve 131 having a mounting shaft 132 extending therefrom is mounted in the interior portion 103 of the housing with the mounting shaft extending through the mounting bore. A gauge bore 133 is provided in the top wall 102 of the housing in alignment with the regulator valve. An indicator gauge 134 is operably secured to the regulator valve and extends through the gauge bore of the top wall to the exterior of the housing. A control handle 135 is mounted on the distal end of the mounting shaft on the exterior of the housing. The regulator valve has an input opening 140 and an output opening 141 and is adjustable to control the passage of air therethrough by operation of the handle to achieve the desired pressure. The gauge registers the amount of air pressure at the output opening of the valve thereby indicating the equivalent air pressure within the tank. A check valve 142 is mounted in communication with the input opening, as shown in FIG. 2. A second air line 143 operatively interconnects the outlet coupling 115 of the selector valve 112 and the check valve.

A second bubbler 151 having a plurality of air openings 152 and a horizontal cover plate 153 is mounted in the bottom wall 20 within the interior 36 of the tank 35. A third air line 154 interconnects the output opening 141 of the regulator valve 131 and the second bubbler, as best shown in FIG. 2. A conventional pressure release valve 155 is mounted in the cylindrical wall 12 of housing 11 in communication with the interior 36 of the tank 35 adapted automatically to release an undesirable buildup of pressure within the tank. The valve has an adjustment screw 156 to adjust the pressure at which the valve will release compressed air from the interior of the tank.

OPERATION

The operation of the described embodiment of the subject invention is believed to be clearly apparent and is briefly summarized at this point. The handling device 10 of the present invention is fully adaptable to mix, store and discharge a wide variety of types of viscous fluids. However, the device is herein shown and described for use in the handling of ceramic slip indicated generally by the numeral 160 within the interior 36 of the tank 35 and in the receptacle 42. The slip is intended for injection into ceramic molds 161 having injection openings 162.

In use, the device 10 is transported on its swivel wheels 59 to a position adjacent to a source of compressed air, not shown. In the manufacture of ceramic products, it is quite common to maintain a source of compressed air in the manufacturing plant so a supply of compressed air does not need to be acquired solely for the use of the handling device of the present invention. The source of compressed air is connected by means, not shown, to the intake coupling 114 of the selector valve 112. The selector lever 116 of the valve is adapted to be moved to several operable positions to utilize the compressed air as desired. In a first position, the valve is closed to prevent air from entering the device. In a second position, air is directed only through the second bubbler 151 into the tank 35. In a third position, air is directed through both of the bubblers 121 and 151.

In order to use the device 10, the first drain valve 78 is closed by means of the handle 79 and the second drain valve 87 is opened by means of the handle 88. Ceramic slip 160 is then poured through the grate 37 into the receptacle 42. The slip gravitates through the drain opening 72, the drain conduit 71, the drain pipe 75, and into the interior 36 of the pressure tank 35, as best shown in FIG. 2. It is preferred that a sufficient quantity of slip be poured into the interior of the tank to permit use of the device for a relatively prolonged period of time so as to avoid the necessity of continually refilling the device.

Pressurization of the tank 35 is achieved by moving the selector lever 116 of the selector valve 112 to the indicated position to allow compressed air to pass through the second bubbler 151 and into the tank. The air passing through the bubbler is caused to pass outwardly against the cover plate 123 and then upwardly through the slip, as shown in FIG. 2. Such bubbling develops a circulating current within the slip which helps insure continued mixing and avoidance of coagulation. It will be seen that such bubbling must be initiated periodically to maintain the desired pressure. This periodic bubbling also aids in circulating the slip periodically to prevent coagulation. The control handle 135 of the regulator valve 131 is adjusted to maintain the desired air pressure within the interior 36 of the tank. The pressure is registered by the indicator gauge 134 to guide the operator in selecting the desired pressure. The optimum air pressure has been found to be about 18 pounds per square inch or roughly 4 pounds per square inch greater than atmospheric pressure. When such a pressure is reached within the tank, the regulator valve automatically opens and closes to maintain the desired pressure in the tank. The screw 156 of the pressure release valve 155 is adjusted in the conventional manner so that if there is an inadvertent excessive buildup of pressure above that selected and desired within the tank, the excess pressure is discharged through the release valve.

The device 10 is then ready for use. The ceramic molds 161 which are to be used in casting ceramic products, are positioned on the grate 37. The operator then positions the injector nozzle 58 of the release valve 56 in the injection opening 162 of a ceramic mold and presses the trigger 57 to open the release valve. Ceramic slip is thereby caused, under moderate pressure, to flow smoothly and evenly from the injector nozzle into the injection opening of the ceramic mold to be filled. When filled, the trigger is released and the flow of ceramic slip is thereby instantaneously terminated. The nozzle is then moved to the injection opening of the next ceramic mold and the trigger is again activated to discharge slip into that mold. Each mold is thereafter filled in the same manner until all of the molds have been filled. The filled molds can then be thereafter positioned on the platform 39 for hardening. Depending upon the article to be formed, the excess slip contained in each mold can be poured out of the mold, in the conventional manner, and through the openings 38 of the grate 37, leaving only the desired congealed shell within each mold.

The excess ceramic slip 160 can either be held in the device 10 for disposal later, or can be returned to the pressure tank 35 for subsequent reuse. In order to hold the slip for subsequent disposal, the second drain valve 87 must be closed, using its handle 88. The excess slip is thereby caused to be collected in the drain pipe 75 and the drain conduit 71 as well as in the receptacle 42. Where a relatively large operation is involved, as in a commercial enterprise, a rather large quantity of excess slip is frequently accumulated within the receptacle, as shown in FIG. 2. In order to insure that this slip does not congeal during retention prior to disposal, the selector lever 116 of the selector valve 112 is positioned so as to allow air to pass through the first bubbler 121 so as to cause a current to be developed in the excess slip retained in the receptacle. Such a current prevents coagulation of the slip. When it is desired to discharge the excess slip from the device, the device is wheeled to a convenient area for such discharge and the drain plug 77 is removed from the remote end 76 of the drain pipe. The first drain valve 78 is then opened, using its handle 79, to allow the slip to flow out through the drain pipe and out of the device. The cylindrical screen 124 prevents foreign objects contained in the slip from passing through the drain conduit 71 so as to avoid clogging of the drain conduit and drain pipe. In this same manner, the receptacle can be flushed and cleaned. This is accomplished by removing the grate from the device and scrubbing the outer surface 26 of the top wall. Water and cleaning solution from the cleaning operation can then be washed from the device through the drain conduit and pipe.

As mentioned, the excess slip 160 can also be recirculated for subsequent reuse. This is accomplished by first de-pressurizing the tank 35 utilizing the pressure release valve 155. Next, the first drain valve 78 is closed and the second drain valve 87 is opened to allow the slip to pass through the drain conduit 71, and the drain pipe 75 for return to the interior 36 of the tank.

It will be seen that during continued use of the device 10, the air pressure tends to decrease. When it does so, the regulator valve 131 operates automatically to bring the pressure up to the level predetermined by the positioning of the handle 135.

The check valve 142 acts, in the conventional manner, to prevent an undesirable return of the slip 160, under motivation of the pressure within the tank, through the second bubbler 151 by closing the instant that a reverse movement of air within the third air line 154 and regulator valve is initiated.

The viscous fluid handling device 10 of the present invention thereby provides a convenient means of mixing, storing and discharging ceramic slip for use in large ceramic manufacturing operations as well as for use in the home. Experience has shown that ceramic slip can be stored in the pressure tank 35 for prolonged periods of time reaching as long as one month without the necessity of continually bubbling air through the slip. This is achieved by preventing exposure of the slip in the tank to evaporation. The device thereby constitutes a convenient, inexpensive and efficient means for handling viscous fluids for both commercial and private use.

The device of the present invention permits the much more convenient, speedy and accurate casting of ceramic articles from slip than attainable by the hand pouring of slip into the molds. Further, because of the even and dependable flow achieved, the resultant castings are superior, rejects are minimized, and waste is eliminated. Other than hand casting, the only previous known procedure for casting ceramic articles involved the utilization of pumps to deliver the slip. Slip is so abrasive that the pumps were rapidly worn out, it not being uncommon for such pumps to last only through three or four days of casting operations. The device of the present invention has virtually no working parts engaged by the slip and thus is not subject to wear by the slip. As a result, the device has extremely long life.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A device for mixing viscous fluid to a uniform consistency while substantially precluding the permanent introduction of air bubbles thereto, for storing the fluid so as to minimize coagulation, and for selectively discharging such fluid in a uniform flow so as substantially to preclude the introduction of air bubbles, the device comprising a viscous fluid receiving pressure tank; a bubbler mounted in the tank; means for discharging a gas through the bubbler into the tank at a regulated rate so as to maintain a pressure within the tank greater than atmospheric pressure; a conduit mounted on the tank to conduct fluid therefrom; a selectively operable fluid release valve connected in flow controlling relation to the conduit; a fluid receptacle mounted on the pressure tank; and means mounted on the receptacle for selectively discharging fluid from the receptacle for disposal and for transfer to the pressure tank.

2. The device of claim 1 in which a bubbler is mounted in the receptacle and connected to the gas discharging means to prevent fluid received therein from coagulating prior to discharge from the receptacle.

3. A device for the mixing, storing, and injecting ceramic fluid comprising an upwardly facing concave top wall defining a ceramic fluid receiving receptacle and having a drain opening; a ceramic mold support grate mounted on the top wall in covering relation to the receptacle; a first bubbler secured on the top wall adjacent to the drain opening within the receptacle; a drain conduit mounted on the top wall in fluid transferring communication with the drain opening thereof; a drain pipe affixed on the drain conduit; a return pipe secured on the drain conduit; means for selectively discharging fluid from the receptacle through the drain pipe and return pipe; a pressure tank, having upper and lower ends and a fluid receiving interior, the upper end of the pressure tank having the top wall mounted thereon with the interior of the tank in fluid receiving relation to the return pipe; a second bubbler mounted in the interior of the tank on the lower end thereof; a fluid transfer conduit secured on the tank in communication with the interior thereof, said transfer conduit having a remote end; a selectively operable fluid release valve mounted on the remote end of the transfer conduit; a pressure regulator valve; a first line connected to the first bubbler; a second line connecting in series the regulator valve and the second bubbler; and a selectively operable valve adapted for connection to a source of gas under pressure connected in parallel with the first and second lines.

* * * * *

UNITED STATES PATENT OFFICE
CERTIFICATE OF CORRECTION

Patent No. 3,820,577      Dated   June 28, 1974

Inventor(s)   Ray F. Sidebottom

It is certified that error appears in the above-identified patent and that said Letters Patent are hereby corrected as shown below:

In the Specification:

Column 4, line 4, after "openings" and before "and" delete "112" and insert ---122---.

Signed and sealed this 17th day of September 1974.

(SEAL)
Attest:

McCOY M. GIBSON JR.
Attesting Officer

C. MARSHALL DANN
Commissioner of Patents